Figure 1:
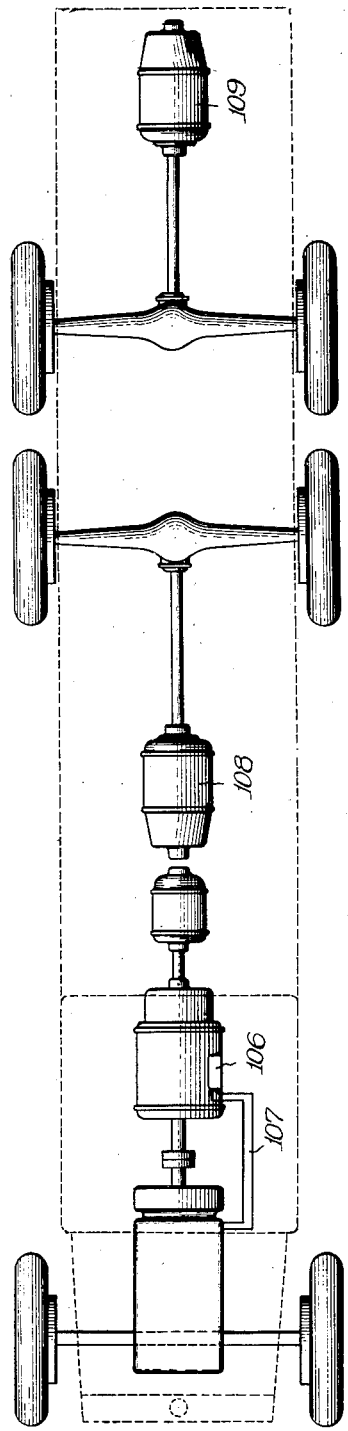

Nov. 14, 1939.   M. ERNST ET AL   2,179,546
DRIVE SYSTEM FOR GAS ELECTRIC AUTOMOBILES
Original Filed May 15, 1931   3 Sheets-Sheet 1

Inventors
Matthew Ernst,
Harry B. Holthouse,
By George E. Mueller
Atty.

Nov. 14, 1939.  M. ERNST ET AL  2,179,546
DRIVE SYSTEM FOR GAS ELECTRIC AUTOMOBILES
Original Filed May 15, 1931   3 Sheets-Sheet 3

Inventors:
Matthew Ernst,
Harry B. Holthouse,
By George E. Mueller
Atty.

Patented Nov. 14, 1939

2,179,546

UNITED STATES PATENT OFFICE 2,179,546

DRIVE SYSTEM FOR GAS ELECTRIC AUTOMOBILES

Matthew Ernst and Harry Barnard Holthouse, Chicago, Ill.; The Northern Trust Company executor of said Matthew Ernst, deceased, said company assignor to The Northern Trust Company, Chicago, Ill., a corporation of Illinois Application May 15, 1931, Serial No. 537,706
Renewed November 12, 1937

31 Claims.   (Cl. 172—239)

Our invention relates in general to mechanical electric drive systems; and relates more in particular to a drive system for a gas electric type of automobile such as a truck or bus.

The theoretical advantages to be obtained by an electric drive for large trucks and busses have not worked out thoroughly satisfactorily in practical use. Various specific designs and systems have been devised and some are operated with a partial success, but in general certain disadvantages are found to be present. One difficulty is the matter of control, as it has been found that the controlling system was too complicated for practical use. Another disadvantage is that no practical and thoroughly satisfactory electric motor system has been available, due to inherent characteristics of the different types of motors. Series wound motors, for example, provide the requisite starting torque for rapid acceleration, but due to certain characteristics of these motors they have in themselves the capacity to produce their own destruction. When one wheel is in a position where it can slip, for example, the series wound motor may turn so rapidly as to destroy itself. Shunt wound motors have the advantage of limiting speed when the load is removed, but they have not the valuable starting torque characteristics of the series wound motor. The advantages to be obtained from motor braking have not been materialized in most cases, due to the fact that at slow speeds the braking value dropped off to almost zero due to a substantially total loss of field current.

The principal object of the invention is the provision of an improved mechanical electric driving system.

Another object is to obtain the combined desirable characteristics of a series wound motor with the desirable characteristics of the shunt wound motor.

Another object is the provision of an improved braking system for electrically driven vehicles.

Another object of the invention is the provision of safety means for preventing injury to any part of a mechanical electric drive system.

Another object is the provision of improved driving connection between the motors and driving wheels.

Figure 2:
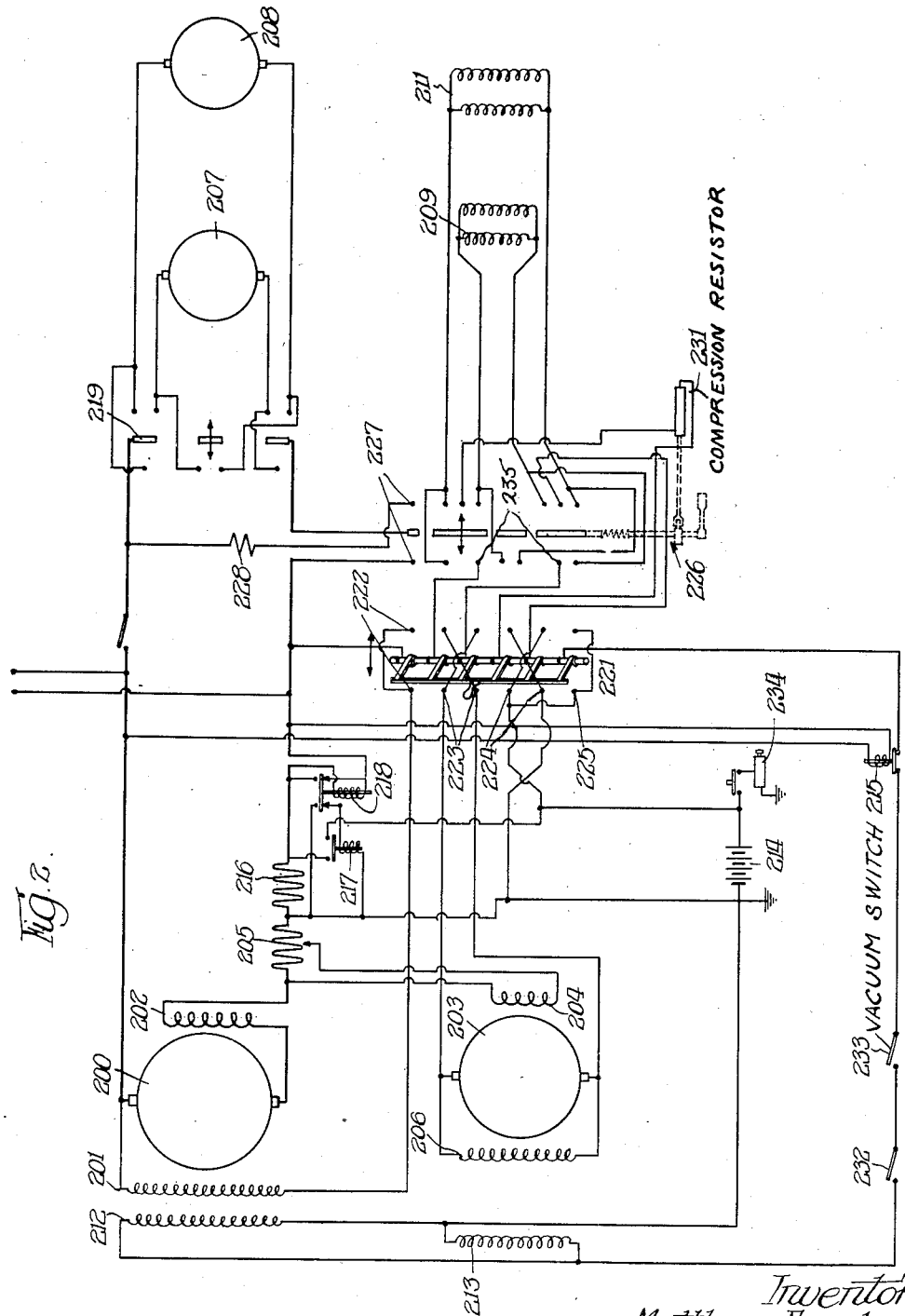
Figure 3:
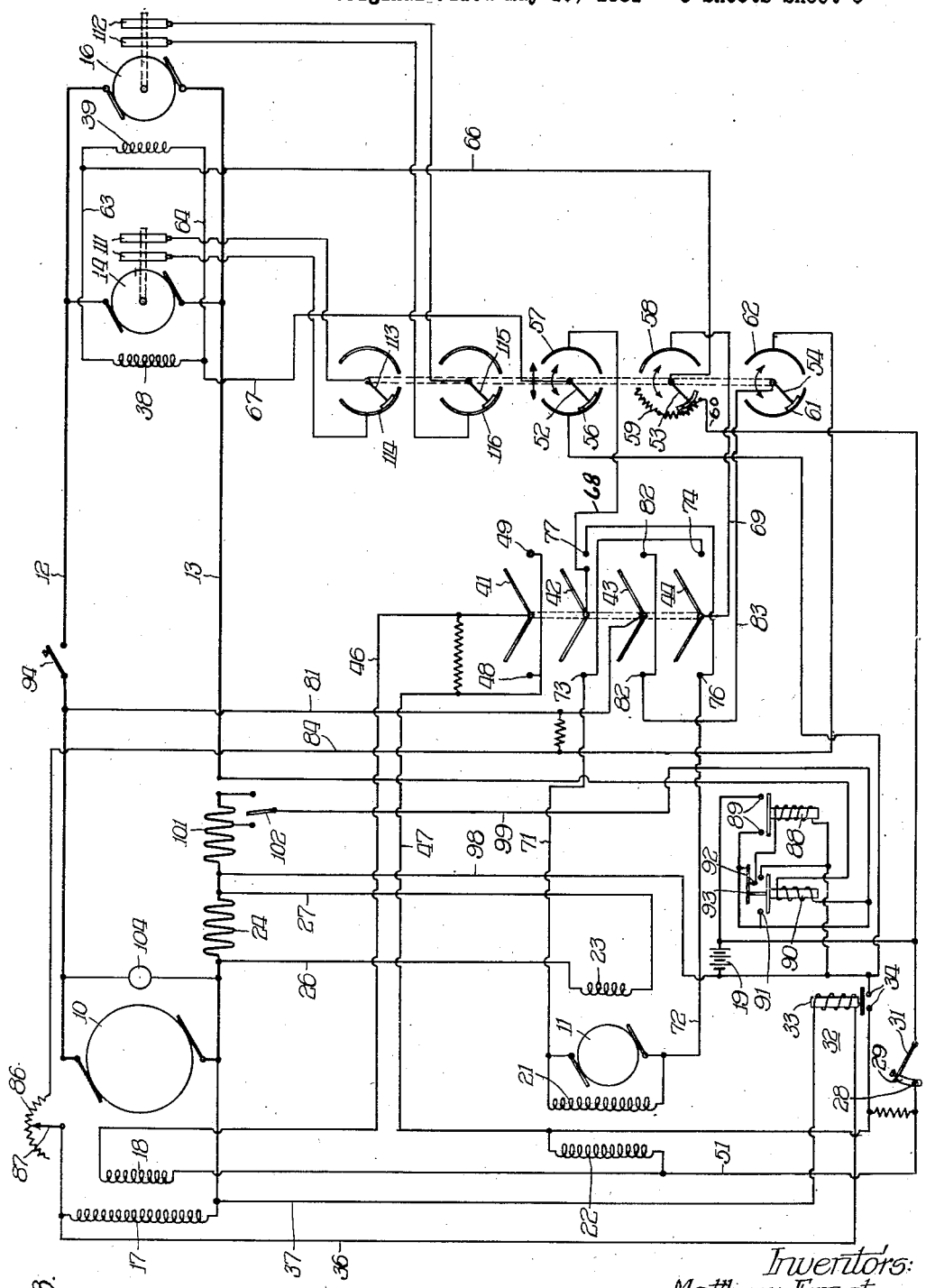

Other objects will be apparent from a consideration of the following detail description taken with the accompanying drawings, wherein:

Fig. 1 is a diagrammatic plan view of an automobile truck provided with the features of our invention, Fig. 2 is an electrical diagram of the system, and Fig. 3 is an electrical diagram of a modified form of the invention.

According to the general features of the invention, we provide a generator driven directly from some mechanical means such as a gasoline engine for supplying armature current to direct current motors. A second generator driven on the same shaft with the first serves as an exciter for the field coils of direct current motors. The main generator has a shunt field and a series field, while the exciter is compound wound, having a field in series with the generator armature circuit and a shunt field across the exciter armature circuit.

In addition, each generator has a battery excited field winding, wound so as to take a heavy battery current and excite the fields of both generators. This action of course is to be controlled to any desired extent. The battery and these field windings are connected across a low resistance series resistance element in the armature circuit of the main generator so that the battery will begin to be charged practically at the same instant that the generator fields become excited. The battery will therefore carry a heavy load only instantaneously and acts like an equalizer to insure that the main generator even at low speeds will supply charging current to the battery and load current to the motors. When the shunt and series fields of the main generator become excited, the field and armature core of this generator are practically saturated magnetically and this battery excitation would not therefore materially increase the output of the generator, and therefore when the current in these fields is sufficient to fully excite the generator the battery fields are automatically disconnected.

On account of the separate excitation of the armatures and fields of the motors by individual generators, the currents in the armatures and fields may be proportioned for best operating results under different conditions. For instance, at starting or under heavy loads the field currents can be made of greater relative value to armature currents than obtainable with series motors resulting in greater torque, but as the speed of the motors increase, the fields should be weakened to permit the armatures to speed up, yet the field should have a substantial value to prevent the motor from running away, which is a shunt characteristic. The arrangement is such that the optimum results are obtained under the various conditions encountered in operating a motor vehicle.

Braking means is also provided whereby the motor armatures are substantially short circuited and the fields of the motor are connected to the battery through a variable resistance operated by the brake pedal so that the field current is light at first when the motor armatures are rotating rapidly and as the armatures slow down the field currents are increased to obtain a good braking action even at very low speeds.

Referring to Fig. 2, a main generator is shown having an armature 200 which is directly connected to the engine shaft. This generator has a shunt field 201 and a series field 202. A second auxiliary or exciter generator is shown having an armature 203 and an accumulative series winding 204, which is in series with the main generator armature preferably in the circuit supplying current to the motor armatures 207. This winding 204 may be directly in series with the main generator armature, or it may preferably be tapped across a portion of a variable resistance 205 in series with the armature of the main generator. The exciter generator also has a shunt field 206. The main generator supplies armature current to the armatures of motors 207 and 208. The auxiliary generator supplies field current to the fields 209 and 211 of motors 207 and 208, respectively.

At low speeds the shunt and series fields of the main and auxiliary generators are insufficient to properly excite the generators, and therefore a battery and shunt excited field 212 is provided for the main generator, and a battery and shunt excited field 213 is provided for the auxiliary generator. These fields are connected in parallel and are energized by a battery 214 and shunt 216 and are in the same relation to the circuit and have the same characteristics as fields 204 and 202 when they are energized by the generator 200. When the voltage of the main generator reaches a predetermined value, the battery and shunt excited fields are disconnected by a potential relay 215. The battery and shunt excited fields of the generators are so wound that they will substantially excite the generators. After the series and shunt fields of the generators come into action, the excitation of these generators is not materially increased, because the field cores are already substantially magnetically saturated by the battery and shunt excited fields. When the voltage of the main generator reaches a predetermined value at which the shunt and series field windings are by themselves capable of fully exciting the generators, the auxiliary field windings 212 and 213 are disconnected. The disconnection of the auxiliary fields at this time will not produce any material drop in the output of the generators, because the generators are already fully excited by the shunt and series winding, and only the excess ampere-turns of the auxiliary field are removed.

In order to accomplish this result, the auxiliary fields must be wound so as to draw a heavy current from the battery until the shunt 216 has sufficient potential drop to fully feed them. However, this drain on the battery is only instantaneous, because as soon as the generators are excited to a predetermined value, the output current will be sufficient to cause sufficient drop across the shunt to excite the field windings; and also begin charging the battery. For this purpose a variable resistance element 216, whose value determines at what value of generator load current the battery starts to charge, is connected in series with the main generator armature, and a pair of relays 217 and 218 are provided to connect the battery across this resistance as soon as the potential drop across the resistance is high enough to charge the battery and supply current to the auxiliary fields and disconnect the battery when the potential drop across resistance 216 becomes too high for charging the battery. When the armature of relay 218 is in its lower or normal position, the coil of relay 217 is in parallel with resistance 216, and when the potential drop across resistance 216 reaches a predetermined value, the armature of relay 217 will close the contacts of this relay and connect the battery in parallel with resistance 216. This connects the battery so as to be charged by the generator current. The value of resistance 216 is so chosen that the battery will draw a heavy charging current so as to replace in a very short time the energy consumed in exciting the auxiliary fields and generators. The coil of relay 218 is connected in series with the armature of the main generator and when the armature current reaches such a value that the charging voltage will be too high, the armature of relay 218 moves upwardly to short circuit resistance 216 and the opening of the back contacts of this relay will de-energize the coil of relay 217, thus disconnecting the battery from the charging element.

It has been found that in starting a heavy load when the armatures of motors 207 and 208 are at a standstill or moving very slowly, they will not have a sufficient torque to start the load if they are connected in parallel. This is due to the well known fact that the load resistance of a generator should be substantially equal to the internal resistance of the generator. When the armatures of motors 207 and 208 are substantially at a standstill, the absence of counter E. M. F. in the armatures reduces their effective resistance to such an extent that it is negligible compared to the generator resistance, and therefore the power delivered to the motors will be small. For this reason we provide a switch mechanism 219 for changing the armatures from a normal parallel connection to a series connection, whereby the effective resistance of the armatures is increased to such an extent that the generator can function to better advantage.

We also provide a switch 221 for driving the motors either in a forward or reverse direction, and also for placing the vehicle in neutral. The upper contacts 222 of this switch are in the circuit of the shunt field 201 of the generator. It will be noted that when the switch is in either the forward or reverse position the shunt field will be connected in the same way. However, when the switch is in neutral position, the shunt field of the main generator will be disconnected. The second set of contacts 223 are in effect a double throw double pole switch in the armature circuit of the exciter generator 203, and serve to reverse the fields 209 and 211 of the motors for driving them in a reverse direction. The fields 209 and 211 are illustrated as parallel windings. That is, if, for instance, a four pole motor is used, the poles are connected in parallel pairs so that it is possible to use a low voltage exciter generator for the fields. This permits the use of a low voltage battery for exciting these fields during dynamic braking. The armature windings of the motors are preferably high voltage windings. The contacts 224 are also in effect parts of a double pole double throw switch in the battery leads. The lower contacts 225 merely serve to disconnect the battery from the auxiliary fields when the main switch is in neutral position.

A second switch 226 is provided for changing the system from running to braking condition. When this switch is in the running position the switch arms are connected to the contacts at the left hand side of the switch. The upper contacts 227 serve to disconnect the main generator from the motor armatures and short circuit the motor armatures through a resistance element 228. The contacts 235 of this switch come from the armature of the exciter generator and connect the fields 209 and 211 in series when the switch arm is in the running position.

When the brake switch is moved to the brake position, the fields 209 and 211 are connected in parallel to battery 214 through a variable resistance 231. This switch is so arranged that the initial movement of the brake pedal will throw the switch from running to braking position through a spring on the brake pedal shaft and the further movement of the brake pedal will decrease the value of the variable resistance element 231. Thus, when the motors are running at high speed and the brake pedal is first depressed, the entire resistance 231 will be in the field circuits 209 and 211, and on account of the speed of the armatures of motors 207 and 208 a high braking torque will be had. However, as the speed of the motors decreases, more and more of the resistance is cut out, increasing the strength of fields 209 and 211, until when the motor is almost stopped the full battery voltage will be on these fields. On account of the fact that the armatures of the motors are substantially short circuited, less field is required to do any given amount of braking, and it is immaterial whether these armatures rotate forward or backward. For instance, if the gas motor of the vehicle were to stop in going up a hill, the dynamic brake could be used to brake the vehicle. One of the outstanding features of the dynamic braking system lies in the fact that a low field is applied to the motors when they are rotating fast and when the pedal is first depressed, and as the motors slow down the fields of the motors are gradually increased, reaching their maximum field strength when the resistance 231 is completely cut out and the fields are connected directly across the battery.

It has been found advisable to place an ignition switch 232 in the battery circuit so that when the gas motor is shut off the battery will be disconnected from the auxiliary fields. In addition to this ignition switch, it is also desirable to provide a vacuum switch 233. The vacuum in the vacuum system of a gas engine reaches a high value when idling so distinctly different in value from what it is under load conditions of the motor, that the vacuum switch provides a convenient method of insuring that the auxiliary fields will be disconnected from the battery and shunt when the motor is idling. I have also illustrated a starting motor 234 operated from the battery 214, although this forms no part of the present invention.

One of the outstanding characteristics of the system is that at low driving speeds the electric motors have predominantly series characteristics or over series characteristics; while at driving speeds they have predominantly shunt characteristics.

At times it may become convenient to vary the coupling between the gas engine and the electric motors. For instance, when the vehicle is moving up a steep grade, the vehicle should travel slowly, while the gas engine should operate at a relatively high speed. This coupling may be adjusted by means of the potentiometer resistance 205. At the portion of the resistance across which the accelerator series field of the exciter is connected is increased, the field strength of the motors may be greater in proportion to the armature current in armature circuit than in the ordinary series motor giving a high torque but slow speed to the motors for heavy loads. At lighter loads when speed is desired, the resistance 205 is decreased.

The fields 212 and 213 have been referred to in the specification as battery excited fields. However, it will be noted that when relay 217 is actuated, which occurs prior to the actuation of relay 215, the battery although connected to the battery fields, will not be delivering current to the fields but will be receiving a charge, so that in effect these battery excited fields may be considered as auxiliary fields, which are equivalent to battery excited fields, although the battery acts more in the nature of an equalizer.

Referring next to the system as shown in Fig. 3, we provide a main generator including an armature 10, which is driven directly from the shaft of a mechanical driving means such as a gasoline engine, and an exciter having an armature 11 is also driven through the same shaft connections. Current generated in the armature 10 is delivered through main conductors 12 and 13 to armatures 14 and 16 of the driving motors.

In connection with the main generator, we provide a shunt field 17 connected electrically to the main generator armature 10 by a suitable switch mechanism to be described. An auxiliary field 18 is also provided adapted to be supplied by current from a battery 19 through suitable control means to be described. The exciter has a shunt field 21 and an auxiliary field 22. An accumulative series field 23 is also provided supplied with current from the main conductor 13, a shunt 24 being provided between the terminals of conductors 26 and 27 leading to the series field 23. The exciter may be provided with an extra heavy series winding, and the shunt 24 omitted entirely.

The auxiliary fields of the exciter and main generator are adapted to be supplied with current from the battery 19 at starting speeds. For securing this result we provide a terminal 28 and a sliding contactor therefor 29 closed by the initial operation of the foot accelerator switch 31. This closes the circuit, including the battery 19 and the auxiliary fields, which circuit is adapted to remain closed until the generators have attained sufficient speed to generate adequate current to supply the shunt fields. To cut out the battery circuit we provide a solenoid 32 having an armature 33, which is adapted to be drawn out of the contact with contacts 34, when the voltage across the shunt field 17 reaches such a value as to effectively excite the generator without the auxiliary fields. The solenoid 32 through electrical conductors 36 and 37 is connected to opposite sides of the shunt field 17 of the main generator. Accordingly, it will be seen that the voltage delivered to the shunt field will be applied to the solenoid 32. It will be understood that the contacts 28 and 29 are closed as long as the foot accelerator is depressed to any extent, so that at any running speed of a gasoline engine, for example, these contacts will be closed.

As to the motors, fields 38 and 39 are provided for the motors 14 and 16 respectively. These fields are separately excited from the exciter 11, or they may be supplied with current directly from battery 19, as will be described. In normal driving it will be seen that as the generator increases in speed and consequently in output E. M. F. the exciter also increases in the same proportion in speed and output current and therefore the flow of current in the armatures and fields of the driving motors increases proportionately. Now with any given constant speed of gas unit the variations of grade and load will make the motors take more or less load which causes a variation of current in the armature circuit, which acting through accelerator series field 23 of exciter varies the field current supplied to fields 38 and 39 to any desirable ratio, depending on resistance value of shunt 24. The value can be made to give straight series characteristics or may be made to give more than the equivalent field strength than a series motor will give in proportion to the armature current which is a valuable feature when having a limited source of power. By over exciting the fields less armature current is required to get a given torque, which in effect lengthens the time element and requires less power from prime mover by doing work at a lower rate of speed. In addition, it is obvious that with this system the vehicle speed can be controlled solely by controlling the speed of the mechanical driving unit, in the preferred form—a gasoline engine.

The vehicle equipped with the system of our invention is capable of the same driving speed in either a forward or reverse direction as controlled by the speed of the gasoline engine, and a neutral control is provided whereby the gas engine may be operated without any possibility of driving the vehicle. We provide a single switch having a plurality of contact arms 41, 42, 43 and 44 for the proper control of the circuit. These arms are connected to a single rotatable shaft, or other moving member and are operable in unison by any suitable means. The switch arms are shown in neutral position, rotatory movement in a counterclockwise direction, looking at the drawings, prepares the circuits for a drive in a forward direction, while clockwise movement of the switch arms connects the system for a reverse drive.

Referring now to the switch arm 41, this arm is permanently connected through a conductor 46 with one side of the auxiliary field coil 18 of the main generator. Through a conductor 47 having terminals 48 and 49, the switch arm 41 is adapted to connect the auxiliary field 18 to the circuit, whereby said coil 18 can be energized. Tracing this circuit further, conductor 51 leading directly to battery and shunt 101 through the foot accelerator switch connects to one side of the auxiliary field coil 18, while the conductor 47 connects to the opposite side of battery and shunt through the contacts 34, which are opened or closed by the armature 33. It will be seen by this circuit that the auxiliary field 22 of the exciter is not disconnected from battery through the operation of switch arm 41, but is available for generating current in the exciter even though the main generator is not delivering. This is of value at certain times for dynamic braking.

Switch arms 42 and 44 function to reverse the motor fields, while switch arm 43 functions to control the main generator shunt field. This portion of the switch establishes electrical connections through an arm 54 of a braking switch when in non-braking position.

The brake switch carries switch arms 52, 53 and 54, these switch arms being carried in any suitable manner known in the art to operate simultaneously, preferably by means of an ordinary type of foot pedal similar to that used for ordinary mechanical braking. However, it will be understood that a hand operated switch arm or other form of switch arm may be used. The switch arm 52 is adapted to connect with contact segments 56 and 57. Switch arm 53 is adapted to engage switch segment 58 and a suitable variable resistance element 59 connected to battery by wire 60.

The ordinary type of compression rheostat may be used for the purpose. Switch arm 54 engages contact segment 61 or contact segment 62. Switch arms 52 and 53 in moving from one segment to the other are adapted to make one before breaking the other. For instance, when switch arm 52 is moving from segment 57 over onto 56, or vice versa, it makes contact with the succeeding segment before breaking from the previous one. This is also true in connection with arm 53 which, when moving from segment 58 to resistor 59, or vice versa, makes one before breaking the other. Briefly, it may be said that switch arm 52 and its associated contacts change the motor field from exciter to the battery source for braking purposes. Switch arm 53 connected in series with switch arm 52 and motor fields is adapted to regulate the current delivered to the motor fields by regulating the resistance in the circuit. Switch arm 54 opens the main shunt field of the generator during braking, thus preventing the delivery of current to the motor armatures, whereby the requisite counter E. M. F. may be generated in the armatures for motor braking. This causes the armature of the generatorator to act as a loading resistance across the motors when they act as generators for braking purposes. Looking at the switch arms of the brake switch, when these arms are rotated in a counter-clockwise direction to the lefthand segments as shown in the drawing, braking action occurs; while when the arms are thrown to the right, the circuit is in the condition for normal running in either a forward or reverse direction.

Now as to the field coils 38 and 39, these are shown in Fig. 3, as connected in parallel across the conductors 63 and 64. A conductor 66 delivers current to one side of the coils, while a conductor 67 supplies the opposite side. Both of these conductors lead to the brake switch, conductor 67 being connected to the switch 52, while conductor 66 is directly connected to switch arm 53.

Refer now to switch arms 42 and 44 of the main switch, which reverses the motor fields for either forward or reverse movement of the vehicle. Switch arm 42 is connected to the segment 57 by a conductor 68. Switch arm 44 is connected to segment 58 by conductor 69. Conductors 71 and 72 are connected to the brushes of the exciter, thereby receiving power from the exciter armature, and these conductors are connected to contact members forming part of the switch assembly. 71 connects with contact member 73 adjacent switch arm 42, and 74 adjacent switch arm 44. Conductor 72 is connected to contact point 76 adjacent switch arm 44 and to contact point 77 adjacent switch arm 42. From these connections and contact points, it will be obvious that the current flowing in the circuit, including the coils 38 and 39, will be reversed as the main switch is thrown from one side to another. Tracing the circuit for forward movement of the vehicle, it will be seen that it includes the exciter 11, conductor 71, contact 73, switch arm 42, conductor 68 switch segment 57, switch arm 52 and conductor 67. On the opposite side of the field coils are conductor 66, switch arm 53, segment 58, switch arm 44 and conductor 72. This assumes that the brake switch is in the run position. For reverse drive of the motors, the same condition and substantially the same circuit is included for the reverse position of the main switch. We believe that this circuit is clear without tracing it completely.

In the control of the main generator shunt field, a connection is established between the main generator conductor 12 and switch arm 43 through a conductor 81. Contact points 82 with which the switch arm 43 is adapted to make contact, both are connected to conductor 83 leading to switch arm 54. The switch segment 62 has connected thereto a conductor 84, which, through a resistance 86 and switch arm 87 is connected to one side of the shunt field coil 17. The opposite side of the shunt field is connected directly to the main armature line 13. It will be seen from the circuit established, that when the arm 43 is in a neutral position no current flows in the shunt field coil 17. Movement of the arm 43 in either direction, however, establishes a circuit which delivers current to the shunt field coil as long as the switch arm 54 is in contact with segment 62. When the arm 54 is thrown to the position shown however, the circuit is interrupted and the shunt field coil 17 is no longer supplied with current. This prevents delivery of power to the motor armatures from the generators, thereby permitting such armatures to generate a heavy current with low E. M. F., which is necessary for effective braking at slow speeds and it is possible to fully control the braking by controlling the motor fields 38 and 39.

It will be understood that the entire control of the speed of the driving motors is the foot accelerator pedal, which delivers fuel to the internal combustion engine. It is a well known fact that when the gasoline engine is speeded up beyond a certain point, the motor torque is gradually lessened. On the other hand, the load torque on a generator shaft is increased as the speed is increased. It follows then that when the shunt field is receiving its full current, the speed of the engine will be limited. We provide means for permitting over-speeding of the gasoline engine, comprising the resistance 86 with the regulating arm 87. Normally, this arm is at the extreme right of the resistance 86 in Fig. 3, at which position the resistance 86 is entirely cut out. Cutting the resistance into the circuit, however, decreases the flow of current to the shunt field 17, thereby decreasing the load on the armature thereby permitting the engine to travel at a higher rate of speed, which allows the generator to adapt itself to a better load condition of the engine and thus increase the power output of the generator. This is of considerable advantage in emergency conditions when there is a more than normal load.

We provide means for charging the battery 19 directly from the main generator, although it will be understood that other charging provisions may be used. The battery may be connected across a series resistance 101 in line 13 through conductors 98 and 99 so that the voltage applied to the battery will be equal to the potential drop in the resistance. This resistance may be tapped at several points and a switch 102 is provided to manually control the voltage applied to the battery.

We also provide a control device for automatically disconnecting the battery from the resistance, except when the voltage across the resistance has a predetermined value. It will be seen that if the battery were connected to the resistance when the voltage across the resistance is too low the battery would discharge through the resistance, and if the voltage is too high the battery will charge at too rapid a rate. To oversome this difficulty a relay 88 is connected across resistance 101 and when the voltage reaches the proper value the relay closes contacts 89 and places the battery in charging connection. A second relay 90 has its winding in series with conductor 13 and when the current in this conductor reaches such a value that the voltage applied to the battery is too high, it closes contacts 91 and opens a back contact 92 by raising arm 93. The opening of back contact 92 breaks the battery circuit and the closing of contacts 91 shunts the resistance 101 out of lead 13. In the form shown, relays are employed making use of an electromagnet. This provision is merely illustrative, however, as other means may be employed to affect the same purpose.

The current delivered from the main generator may be used as an index of the manner in which the gasoline engine is functioning. For testing the condition of the gasoline engine we open a switch 94 and a plug outlet 104 is provided connected directly across the lines 12 and 13 into which a suitable instrument such as an ammeter or volt meter can be connected. It will be understood that this not only serves as a check of the condition of the gasoline engine, but may illustrate the operating characteristics of the system as a whole. We may also employ this outlet for supplying power to auxiliary electric machinery, such as power trailers, refrigerating machines, drills or hoists, or any use to which such a power plant could be used as a portable power plant. In this way the generator functions as a source of power and is immediately available when required. This feature is of particular value when trucks are used on new construction work in which electrical power usually is not available until considerable headway has been made.

As a safety feature, Fig. 1, we mount a thermostat 106 at any suitable location upon or within the main generator or motors, and connect this thermostat in any suitable manner with the mechanical source of power through conductors 107, by means of which the mechanical driving means may be stopped when the temperature in the generator or motors has reached a danger point. In the ordinary gas engine, the thermostat may be connected by suitable means with the ignition circuit to break the ignition circuit when the temperature of the generator is raised above a normal operating temperature.

The number of driving motors and the manner of mounting them for driving the wheels is subject to considerable modification. In Fig. 1 we show a system adapted to be used where four drive wheels are employed. The motors 108 and 109 have their shafts directly connected into the differential housings after the manner of the usual automobile impeller shaft. In this way differential action can occur in each set of wheels and the motors are mounted to obtain the most efficient practical mechanical operation. It is also evident that the main armature and field windings may be extended by means of a suitable cord from the truck to motor operated trailers to be used in conjunction with a truck embodying the invention.

In some cases it has been found that in using the system for dynamic braking with the shunt field 17 of generator 10 disconnected the armature circuit of generator 10 has a sufficiently high resistance to cause a high voltage to be built up across the brushes of motors 14 and 16 to cause sparking or arcing at the brushes. In order to overcome this difficulty, we provide slip rings 111 and 112 on the shafts of motors 14 and 16 respectively. These slip rings are connected to the armature windings of the motors at points 180 electrical degrees apart. Of course the points at which the slip rings are connected to the armature windings may be varied in accordance with the design of the motors. One of the slip rings 111 is connected to an arm 113 on the braking switch and the other slip ring is connected to an arcuate segment 114. One of the slip rings 112 is similarly connected to an arm 115 and the other slip ring is connected to an arcuate segment 116. Thus it will be seen that when the brake switch is moved into the position for dynamic braking as shown in Fig. 3 the slip rings will be short circuited, and when the brake switch is in normal driving position, the slip rings will be open circuited. When the slip rings are short circuited, the motors act as induction motors with stationary fields tending to prevent the rotation of the armatures. With the slip rings connected to points 180 degrees apart, there will be a voltage across the brushes of the motors when the brushes are displaced 90 degrees from the point of connection from the slip rings. However, this voltage is not sufficient to cause any injurious sparking or arcing at the brushes.

It will be understood that the nature and embodiment of the invention herein described and illustrated are merely convenient and useful forms of the invention and that many changes and modifications may be made therein without departing from the spirit and scope of the invention.

What we claim as new and desire to protect by Letters Patent of the United States is:

1. In a gas electric drive system, a motor having an armature and field coils, a ground contact wheel driven by the motor armature, a generator for supplying current to said armature, a second generator for supplying current to said field coils, and means for preventing generation of current in the first generator while still generating current in the second generator, said means including a switch mechanism for rendering the first generator field ineffective and at the same time reducing the field of the second generator whereby said motor may be caused to function as a brake for said wheel.

2. In a gas electric drive system, a motor having an armature and field coils, a generator for supplying current to said armature, a second generator for supplying current to said field coils, means for preventing generation of current in the first generator while still generating current in the exciter, whereby said motor may be caused to function as a brake, and means for delivering battery current to said field coils first in conjunction with and then in place of current from the second generator to compensate for loss of field current from second generator, whereby braking action may take place when the second generator is turning at slow speed.

3. In a mechanical electric drive system, a motor having armature and field windings, a generator for supplying current to the armature winding, a second generator for supplying current to the field winding, said generators having a plurality of field windings, one winding of each of said generators being separately excitable, a battery for said separately excitable windings, said battery having a charging potential applied thereto proportional to the output current of the first generator.

4. In a mechanical electric drive system, a motor having armature and field windings, generator means for supplying current to said windings, braking means including means for rendering the generator armature sufficiently ineffective to substantially short-circuit the motor armature winding, a battery for supplying current to the field winding of the motor during the braking period, and means for controlling the battery current in the field winding of the motor during braking.

5. In a mechanical electric drive system, a main generator having a shunt winding, a motor having armature and field windings, the armature winding being excited by said main generator, an auxiliary generator for exciting said field windings, and dynamic braking means including means for breaking the shunt winding of the main generator and simultaneously reduce the field of the auxiliary generator whereby said main generator is caused to act as a resistance load on said motor.

6. In a mechanical electric drive system, a direct current generator, a motor having armature and field windings, the armature windings of said motor being energized by current from said generator, said motor having a pair of slip rings, and means for maintaining the motor field excitation but simultaneously short circuiting said slip rings for dynamic braking, said latter excitation means being an external source of current independent of the generator current.

7. In a mechanical electric drive system, a direct current generator, having a field winding, a direct current motor having armature and field windings, the armature winding being energized by said generator, means for rendering the field winding of said generator ineffective to energize its associated armature, said motor having a pair of slip rings, and means for short circuiting said slip rings but simultaneously maintaining a motor field excitation for dynamic braking, said latter excitation means being an external source of current independent of the generator current.

8. In a mechanical electric drive system, a commutator motor having armature and field windings, slip rings connected to the armature windings of said motor, said slip rings being normally open circuited and means for short circuiting said slip rings but simultaneously maintaining a motor field excitation for dynamic braking, said latter excitation means being an external source of current.

9. In a gas electric drive system, a compound wound main generator, a second generator, means for driving the main generator and second generator together, an auxiliary field coil for the main generator, an auxiliary field coil for the second generator, a battery and shunt, both said battery and shunt being connected in parallel to the auxiliary fields responsive to the load on the main generator, and means for automatically cutting out the battery and shunt when the voltage has increased sufficiently to develop a satisfactory shunt field excitation in said generators.

10. In a gas electric drive system, a compound wound main generator, a second generator, means for driving the main generator and second generator together, an auxiliary field for the main generator, an auxiliary field for the second generator, a battery, a shunt responsive to the load on the main generator means for connecting said battery and shunt in parallel for delivering current from said battery and shunt to said auxiliary fields when the voltage of the main generator falls below a predetermined value, means for automatically cutting out the battery and shunt when the voltage has increased sufficiently to develop a satisfactory shunt field excitation in said generators, and means for charging the battery from said shunt.

11. In a mechanical electrical drive system, a motor, a generator for supplying current to said motor, a battery, a shunt responsive to the load on said generator, both said battery and shunt connected in parallel for supplying exciting current to said generator, means including said shunt for charging the battery from said generator, and means for disconnecting the battery from the shunt when the output of the generator falls below a predetermined value.

11. In a mechanical electrical drive system, a motor, a generator supplying current thereto, a battery, a shunt responsive to the load on the generator, both said battery and shunt connected in parallel for supplying exciting current to said generator, means including the shunt for charging the battery from said generator, and means for disconnecting said shunt from the battery when the output of the generator increases or decreases from predetermined values.

13. A method of operating an electric motor system from a pair of generators having field coils which consists of supplying armature current for the motor from one generator and field current from the other, exciting said generator field coils from a constant source of electrical power and in accordance with the load on the generator until said generators become self exciting and thereafter disconnecting the generator field coil from said constant source of power.

14. In a gas electric drive system, a compound wound main generator, a second generator, means for driving the main generator and second generator together, an auxiliary field winding for the main generator, a main field winding and an auxiliary field winding for the second generator, a battery, a shunt connected to produce a voltage drop that varies with the load current of the main generator, means for delivering current from the battery and shunt to said auxiliary fields when the voltage of the main generator drops below a predetermined value, means for automatically cutting out the battery and shunt when the voltage has increased sufficiently to develop a satisfactory shunt field excitation in said main generator, a driving motor having an armature and field coils, means for delivering current from the main generator to the main field coil of the second generator, and circuit connections for delivering current from the main and second generators to operate the motor.

15. In a gas electric drive system, a compound wound main generator having a shunt field coil, a second generator, means for driving the main generator and second generator together, an auxiliary field coil for the main generator, an auxiliary field coil for the second generator, a battery, a shunt connected to produce a voltage drop that varies with the load current of the main generator, means for delivering current from the battery and shunt in parallel to said auxiliary fields at all times, except when the main generator voltage is above a predetermined value, means for automatically disconnecting the battery and shunt from the auxiliary fields when the main generator voltage has increased above a predetermined value, a driving motor electrically connected to the main generator, and having an armature and field coil, means including an electrical circuit for delivering current from said second generator to the field coil of the motor, switch means in said electrical circuit for reversing the motor field, said switch having a neutral position for disconnecting the shunt and auxiliary field coils of the main generator, whereby to open said shunt and auxiliary field coil and preventing delivery of armature current from the main generator to the motor whereby drive in either direction is prevented, and whereby said motor may be stationary independent of the speed of said generators when the switch is in neutral position.

16. In a gas electric drive system, a motor having an armature and field coils, a propelling member driven by the motor armature, a generator for supplying current to said armature, an exciter for supplying current to said field coils, and means for substantially preventing the generation of voltage in said generator while leaving it connected to said armature and while still generating current in said exciter and effective by the same operation for reducing the current generated by the exciter whereby said motor may be caused to function as a brake for said propelling member, with said generator acting substantially as a short circuit for said armature.

17. In a gas electric drive system, a motor having armature and field coils, a generator for supplying current to said armature, an exciter for supplying current to said field coils, means for preventing generation of current in the generator while leaving it connected to said armature and while still generating current in the exciter whereby the field of said motor is kept energized to function as a brake, and means for delivering battery energy to said field coils to increase the energization of said coils even if said exciter alone does not supply adequate current thereto, whereby brake action may take place when said exciter is turning at slow speed.

18. In a gas electric drive system, a motor having an armature and field coils, a generator for supplying current to said armature, an exciter for supplying current to said field coils, dynamic braking means for causing said armature to be connected substantially in a short circuit and for thereafter supplying battery current to said field coils and while maintaining a supply of current from said exciter to said field coils until said battery current is supplied thereto to avoid an objectionable time lag due to reenergization of said field by said battery.

19. In a mechanical electric drive system, a motor having armature and field windings, generator means for supplying current to said armature and field windings, including main field coils energized by said generator means and which are sufficient for excitation of said generator means at its higher speeds, auxiliary field coils for said generator means, a battery for actuating said auxiliary field coils during extreme low speeds of said generator, and means for relieving the battery of this load by supplying current to said auxiliary field coil from said generator means at intermediate speeds.

20. In a mechanical electric drive system for vehicles, the combination of a driving motor having an armature and field, a main generator for supplying power to the armature of said motor, a prime mover for driving said generator at ineffective idling speeds and accelerating it to normal operating speeds, an exciter also driven by the prime mover for supplying power to the field of said motor, and having a field, means for partially energizing the field of said exciter at idling speeds whereby the field of the motor is energized at least as soon as said generator and exciter are speeded up beyond the idling speed by said prime mover, and means for energizing the field of said generator continually at all speeds at least after the prime mover has begun to accelerate whereby the load will be placed on the generator and prime mover smoothly, beginning substantially as soon as said prime mover begins to speed up said generator.

21. In a mechanical electric drive system, a direct current generator, a motor having armature and field windings, the armature windings of said motor being energized by current from said generator, said motor having a pair of slip rings, and means assuring and regulating the motor field excitation but contemporaneously short circuiting said slip rings for dynamic braking and causing said generator to cease energizing said armature windings, said latter excitation means being an external source of current.

22. In a mechanical electric drive system, a direct current generator, having a field winding, a direct current motor having armature with commutator and field windings, the armature winding being energized by said generator, means for rendering the field winding of said generator ineffective to energize its associated armature, said motor having a pair of slip rings connected to said armature at points between the commutator connections therewith, and means for short circuiting said slip rings but contemporaneously assuring a motor field excitation for dynamic braking, said latter excitation means being an external source of current independent of the generator current.

23. In a mechanical electric drive system, a commutator motor having armature and field windings, slip rings connected to the armature windings of said motor, said slip rings being normally open circuited, means for short circuiting said slip rings, and means external of said motor for contemporaneously exciting a field winding thereof for dynamic braking.

24. A method of operating an electric motor system from a pair of generators each having a field magnet which includes supplying armature current from one generator and field current from the other, exciting said generator field magnets from a constant source of electric power and exciting them further in accordance with the load on the generator until said generators become sufficiently self-exciting, and thereafter ceasing to excite said field magnets from said constant source of power.

25. In a mechanical electric drive system, a motor having an armature and field windings, a generator including an armature for supplying current to said armature, braking means including means for rendering the said generator substantially ineffective as a generator to cause said generator armature to substantially short circuit the motor armature, and means for supplying current to said field windings for driving and for braking, and means for controlling the current supply to said field windings during braking to control the braking effect of such short circuited armature, said means making the current supplied to said field windings during braking initially extremely low.

26. In a mechanical electric drive system for vehicles, a generator having its main field coils, including a series coil, self excited, a load driving motor having its armature connected to the armature of said generator and having a shunt type field winding connected to be energized by current other than that flowing through its armature even if the latter reverses, electrical means for controlling and at times substantially preventing the generation of voltage in the generator and for causing said motor to act as a brake by building up a generated E. M. F. and causing a reversed current to flow through said generator when the motor is being driven by the vehicle, said reversed current tending to reverse the polarity of said generator; an auxiliary generator field coil, and independent means for energizing it with a polarity cumulative relative to the normal field of the generator even when said series field coil is carrying said reversed current and tending to prevent said reversed current from reversing the polarity of said generator.

27. In a mechanical electric drive system for vehicles, a generator having its main field coils, including a series coil, self excited, a load driving motor having its armature connected to the armature of said generator and having a shunt type field winding connected to be energized by current other than that flowing through its armature even if the latter reverses, electrical means for controlling and substantially preventing the generation of voltage in the generator and for causing said motor to act as a brake by building up a generated E. M. F. and causing a reversed current to flow through said generator when the motor is being driven by the vehicle, said reversed current tending to reverse the polarity of said generator; an auxiliary generator field coil, and independent means for energizing it with a polarity cumulative relative to the normal field of the generator even when said series field coil is carrying said reversed current and having a strength greater than conventional teaser fields.

28. In a mechanical electric drive system, a motor having an armature and field windings, a generator including an armature for supplying current to said armature, braking means rendered effective by a single manually-operable control device and including means for rendering the said generator substantially ineffective as a generator to cause said generator armature to substantially short-circuit the motor armature, and means for supplying curent to said field windings for driving and for braking, and means for controlling the current supply to said field windings during braking to control the braking effect of such short-circuited armature, said means making the current supplied to said field windings during braking initially extremely low.

29. In a mechanical electric drive system for vehicles, the combination of a driving motor having an armature and field winding, a main generator for supplying power to the armature of said motor, a prime mover for driving said generator at ineffective idling speeds and accelerating it to normal operating speeds, an exciter also driven by the prime mover for supplying power to the field winding of said motor, and having a field magnet, means for partially energizing the field magnet of said exciter at idling speeds whereby the field winding of the motor is energized at least as soon as said generator and exciter are accelerated beyond the idling speed by said prime mover, and means for energizing the field magnet of said generator at idling speeds at least when the prime mover is beginning to be accelerated including an externally excited coil having sufficient ampere turns to substantially excite said generator field magnet whereby the load will be placed on the generator and prime mover smoothly, beginning substantially as soon as said prime mover begins to accelerate said generator.

30. In a mechanical electric drive system for vehicles, the combination of a driving motor having armature and field windings, generator means for supplying power to the armature and field windings, a prime mover for driving said generator means at ineffective idling speeds and accelerating it to normal operating speeds, said generator means including field coil means for substantially exciting the entire generator means, an independent source of power for energizing said field coil means, and a control device rendered effective automatically upon the initial accelerating effort of the prime mover for connecting said independent source of power to said field coil means to pre-energize said generator means before it reaches an effective speed whereby the load will be placed on the generator means and prime mover smoothly, beginning as soon as the prime mover and generator means reach an effective speed.

31. In a gas electric drive system, a motor having an armature and field coils, a generator for supplying current to said armature, an exciter for supplying current to said field coils, dynamic braking means including a single manually-operable control device for causing said armature to be connected substantially in a short circuit and for supplying battery current to said field coils and effective to maintain a supply of current from said exciter to said field coils until said battery current is supplied thereto to avoid an objectionable time lag due to reenergization of said field by said battery.

MATTHEW ERNST.
HARRY BARNARD HOLTHOUSE.